(12) United States Patent
Hansen

(10) Patent No.: US 10,568,261 B2
(45) Date of Patent: Feb. 25, 2020

(54) DYNAMIC COMBINE FIRE RISK INDEX AND DISPLAY

(71) Applicant: CNH INDUSTRIAL AMERICA LLC, New Holland, PA (US)

(72) Inventor: John C. Hansen, Denver, PA (US)

(73) Assignee: CNH Industrial America LLC, New Holland, PA (US)

(*) Notice: Subject to any disclaimer, the term of this patent is extended or adjusted under 35 U.S.C. 154(b) by 230 days.

(21) Appl. No.: 15/856,550

(22) Filed: Dec. 28, 2017

(65) Prior Publication Data

US 2019/0200522 A1     Jul. 4, 2019

(51) Int. Cl.
| A01D 41/127 | (2006.01) |
| A01B 79/00 | (2006.01) |
| A01D 91/00 | (2006.01) |

(52) U.S. Cl.
CPC .......... *A01D 41/127* (2013.01); *A01B 79/005* (2013.01); *A01D 91/00* (2013.01)

(58) Field of Classification Search
None
See application file for complete search history.

(56) References Cited

U.S. PATENT DOCUMENTS

| 3,630,003 | A * | 12/1971 | Ashton | ............... | B62D 33/0617 |
| | | | | | 56/14.7 |
| 7,354,341 | B1 * | 4/2008 | Smith | .................. | A01D 41/127 |
| | | | | | 460/4 |
| 7,973,654 | B2 * | 7/2011 | Ehrhart | ................ | A01D 34/664 |
| | | | | | 340/438 |
| 2010/0168989 | A1 * | 7/2010 | Gao | ..................... | F02D 41/2422 |
| | | | | | 701/110 |
| 2013/0180225 | A1 * | 7/2013 | Dexter | .................... | A01F 15/18 |
| | | | | | 56/10.2 R |
| 2014/0365170 | A1 * | 12/2014 | Van Mill | .................. | B60P 1/42 |
| | | | | | 702/173 |

FOREIGN PATENT DOCUMENTS

| CN | 103593584 A | 2/2014 |
| CN | 104464168 A | 3/2015 |
| DE | 10244822 A1 | 4/2004 |
| EP | 0117588 A1 | 9/1984 |
| EP | 0443210 A1 | 8/1991 |
| EP | 0887524 A3 | 12/1998 |
| EP | 1387230 A1 | 2/2004 |
| GB | 2449677 A | 12/2008 |
| WO | 2014030612 A1 | 2/2014 |

OTHER PUBLICATIONS

Extended European Search Report for EP Application No. 18248108.5 dated May 16, 2019 (four pages).

* cited by examiner

*Primary Examiner* — Shelley Chen
(74) *Attorney, Agent, or Firm* — Peter K. Zacharias; Patrick M. Sheldrake

(57) ABSTRACT

A combine including an engine for propelling the combine, a feeder housing for receiving cut crop, a separating system for threshing the cut crop to produce grain and residue, a residue chopper for chopping the residue, and a controller. The controller is configured to estimate risk factors that correlate to a risk of fire in the engine due to airborne particles created by at least one of the cut crop, the separating system or the residue chopper, estimate a fire risk based on the risk factors, and implement corrective action based on the estimated fire risk.

20 Claims, 7 Drawing Sheets

| 532 | 534 | 536 | 538 | 540 |
|---|---|---|---|---|
| CROP | AMBIENT TEMP | NOAA | HUMIDITY | EXHAUST TEMP |
| $C_1 = RISK_{C1}$ | $AT_1 = RISK_{AT1}$ | $NA_1 = RISK_{NA1}$ | $H_1 = RISK_{H1}$ | $ET_1 = RISK_{ET1}$ |
| $C_2 = RISK_{C2}$ | $AT_2 = RISK_{AT2}$ | $NA_2 = RISK_{NA2}$ | $H_2 = RISK_{H2}$ | $ET_2 = RISK_{ET2}$ |
| -- | -- | -- | -- | -- |
| $C_N = RISK_{CN}$ | $AT_N = RISK_{ATN}$ | $NA_N = RISK_{NAN}$ | $H_N = RISK_{HN}$ | $ET_N = RISK_{ETN}$ |

530

E.G., FIRE RISK = WIEGHTED SUM OF ALL 5 RISKS

FIG. 5B

DYNAMIC COMBINE FIRE RISK INDEX AND DISPLAY

FIELD

The invention relates to a combine that dynamically computes an estimated fire risk based on various risk factors, and reports this estimated fire risk to the operator of the combine.

BACKGROUND

Harvesters (e.g. combines) are used to harvest crops. Operations performed by these combines include threshing and separating grain from crop residue, which is then expelled from the combine through a residue system. Such harvesting methods produce small crop particles that may become airborne and potentially enter the air intake of the combine engine compartment and stick to the various engine components. Combine engine components may become hot during harvesting, which can increase the risk of igniting the crop particles.

SUMMARY

An embodiment includes a combine comprising an engine for propelling the combine, a feeder housing for receiving cut crop, a separating system for threshing the cut crop to produce grain and residue, a residue chopper for chopping the residue, and a controller. The controller is configured to estimate risk factors that correlate to a risk of fire in the engine due to airborne particles created by at least one of the cut crop, the separating system or the residue chopper, estimate a fire risk based on the risk factors, and implement corrective action based on the estimated fire risk.

An embodiment includes a method for controlling a combine including an engine for propelling the combine, a feeder housing for receiving cut crop, a separating system for threshing the cut crop to produce grain and residue, a residue chopper for chopping the residue, and a controller. The method comprises determining, by the controller, risk factors that correlates to a risk of fire in the engine due to airborne particles created by at least one of the cutting wheel, the separating system or the residue chopper, estimating, by the controller, a fire risk based on the risk factors, and implementing, by the controller, corrective action based on the estimated fire risk.

BRIEF DESCRIPTION OF THE FIGURES

FIG. 5B is a table for estimating fire risk based on the various risk factors, according to an embodiment of the invention.

DETAILED DESCRIPTION

Aspects of the invention provide methods and systems for operating a combine to automatically estimate a fire risk based on various risk factors, and indicate this estimated fire risk to the operator of the combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
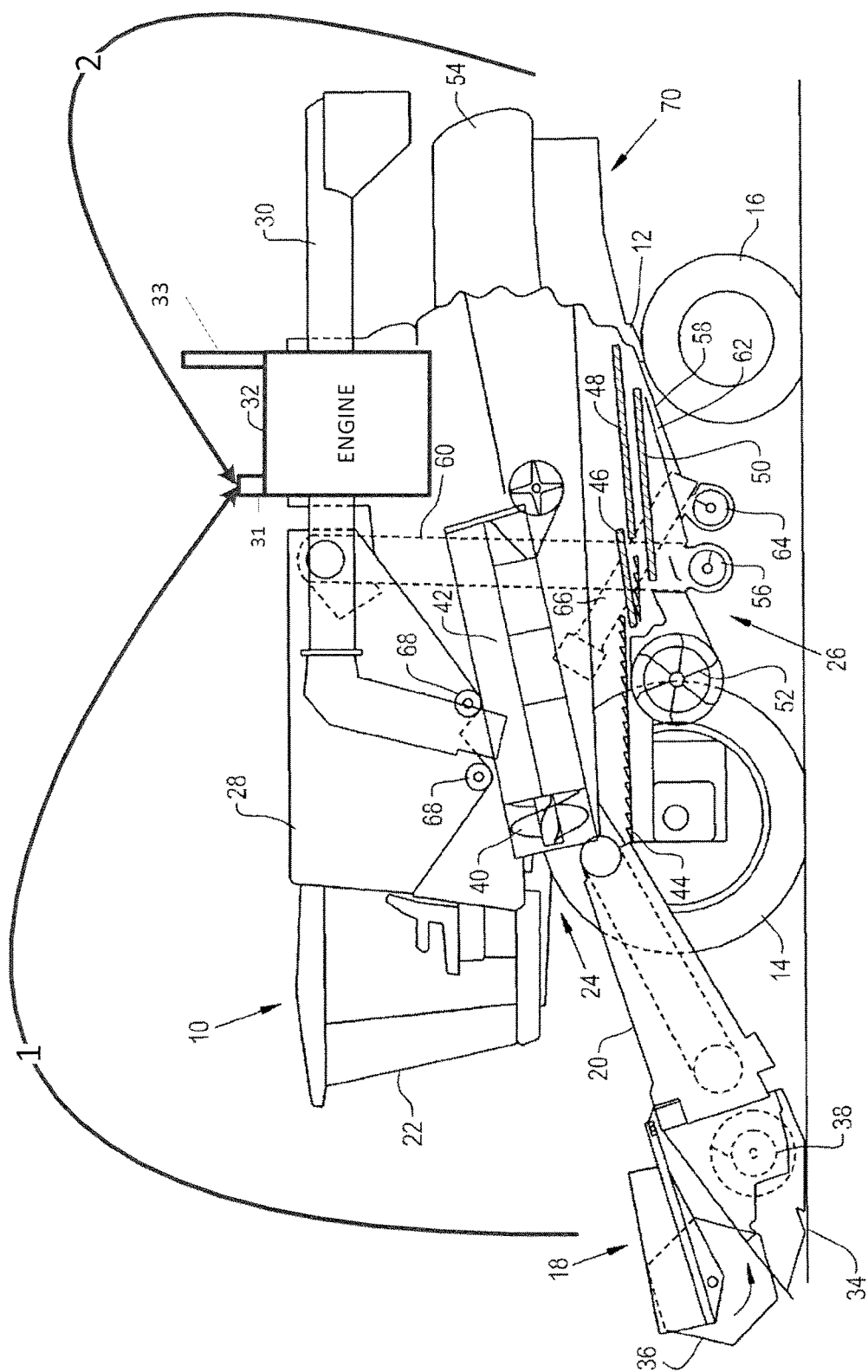
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, a chopper pan, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

The combine also monitors both yield and loss of the grain to ensure efficient operation. Loss is generally defined as a percentage of grain lost. Loss includes grain that is accidentally blown by fan 52 into the straw hood 54 and ejected from the combine rather than collected in the tank. In contrast, yield is generally defined as the amount of grain collected in the tank (e.g. bushels). Loss may be monitored by a loss sensor (not shown) that could be positioned within straw hood 54 (see FIG. 1A). Yield may be monitored by a yield sensor (not shown) that could be positioned within grain tank 28 (see FIG. 1A). Throughput is yet another metric that can be determined based on yield. As described above, yield is determined based on signals transmitted and received by yield sensor 115. Throughput is the amount of crop being processed by the combine at a given time. Generally, throughput can be computed by measuring yield over a time period. Both loss and throughput are risk factors that may be beneficial to controlling various components of the combine.

Diesel engine 32 shown in FIG. 1A may include an air intake port 31, and an exhaust port 32. Air intake port 31 draws fresh air into the engine compartment. This fresh air is used to both cool engine components (not shown), and provide oxygen in the combustion chamber (not shown) of engine 32. Exhaust port 32 expels exhaust produced by engine 32.

During operation, however, air intake port 31 may also draw in airborne crop particles into the engine compartment. These airborne particles are produced by crop that is threshed by header 18 via path 1, and by crop that is ejected from residue system 70 via path 2. Due to factors including oils (e.g. oils in the crop, or engine oil/grease), these airborne particles may stick to various components within the engine compartment (e.g. radiator, engine housing, transmission, etc.).

Over time (e.g. over multiple harvesting runs), a buildup of these particles may occur. If a buildup is present within the engine compartment, various problems could result. For example, if the engine intake filter (not shown) is clogged, then the engine performance may suffer. In addition, it becomes more difficult to cool the engine, which could increase the internal temperature, and therefore the risk of igniting particles.

Figure 1B:
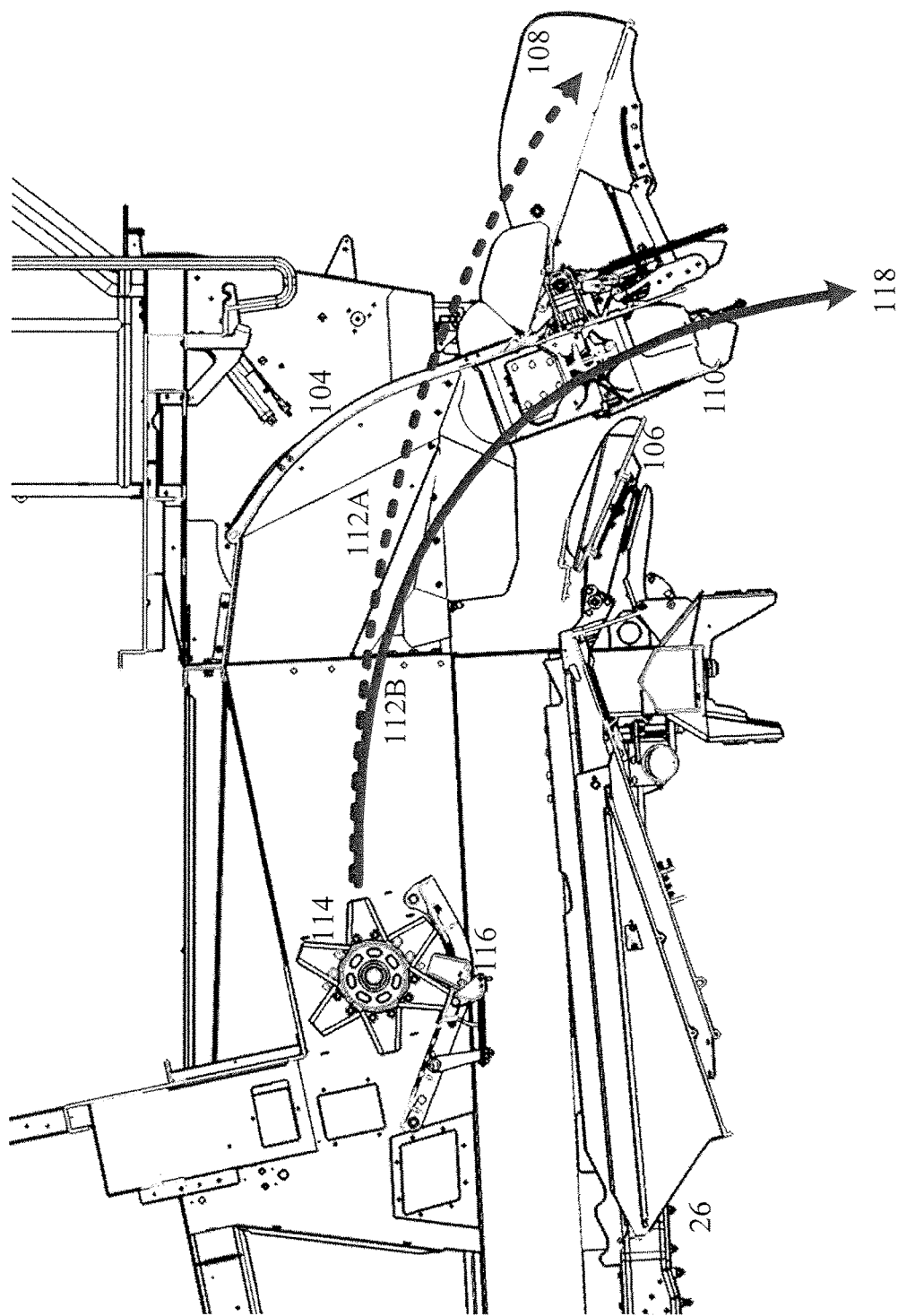
FIG. 1B is a section view of a combine residue system, according to an embodiment of the invention.

As described above, airborne particles may be produced and expelled from the combine via residue system 70. For sake of clarify, details of residue system 70 are also shown in FIG. 1B. For example, as shown in FIG. 1B, residue system 70 includes a windrow door 104, a spreader chute 106, a windrow chute 108, spreader wheels 110, chopper 114 and chopper pan 116. Chopper 114 chops the crop that enters residue system 70. The chopped crop (including the particles) is then expelled either through windrow door 104 and windrow chute 108 via path 112A or through spreader wheels 110 via path 112B.

Although not shown in FIG. 1B, windrow door 104, spreader wheels 110, and chopper 114 are electrically connected to a controller (e.g. programmable logic controller, micro-controller, etc.) located in the combine. The controller is programmable by the operator of the combine through a user (e.g. operator) interface, or through a remote computer (see FIG. 3). The operator, for example, enters commands through the user interface. In response to these commands, the controller sends control signals to the various actuators of residue handling system 70.

Figure 2:
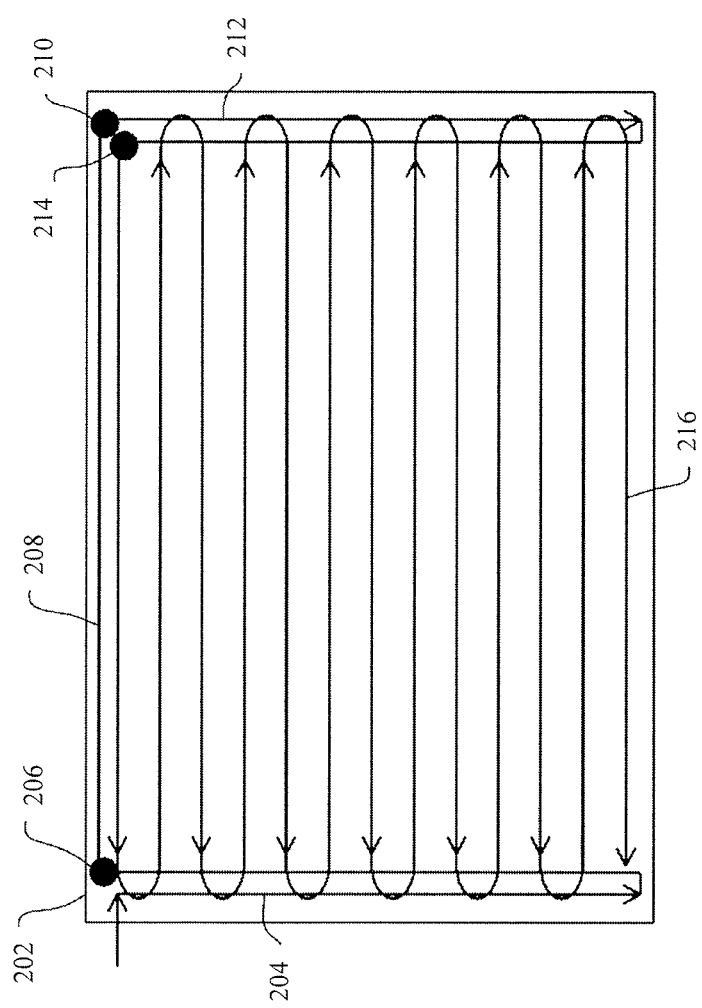
FIG. 2 is a typical path traversed by the combine during harvesting, according to an embodiment of the invention.

During harvesting, the combine travels a certain pathway. The pathways shown in FIG. 2 are typical for a plot of land 202 that is to be harvested. As harvesting is performed, the combine may employ residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216. In either mode, small particles produced by residue system 70, and by header 18 become airborne and enter the engine compartment where they build up over time.

Figure 3:
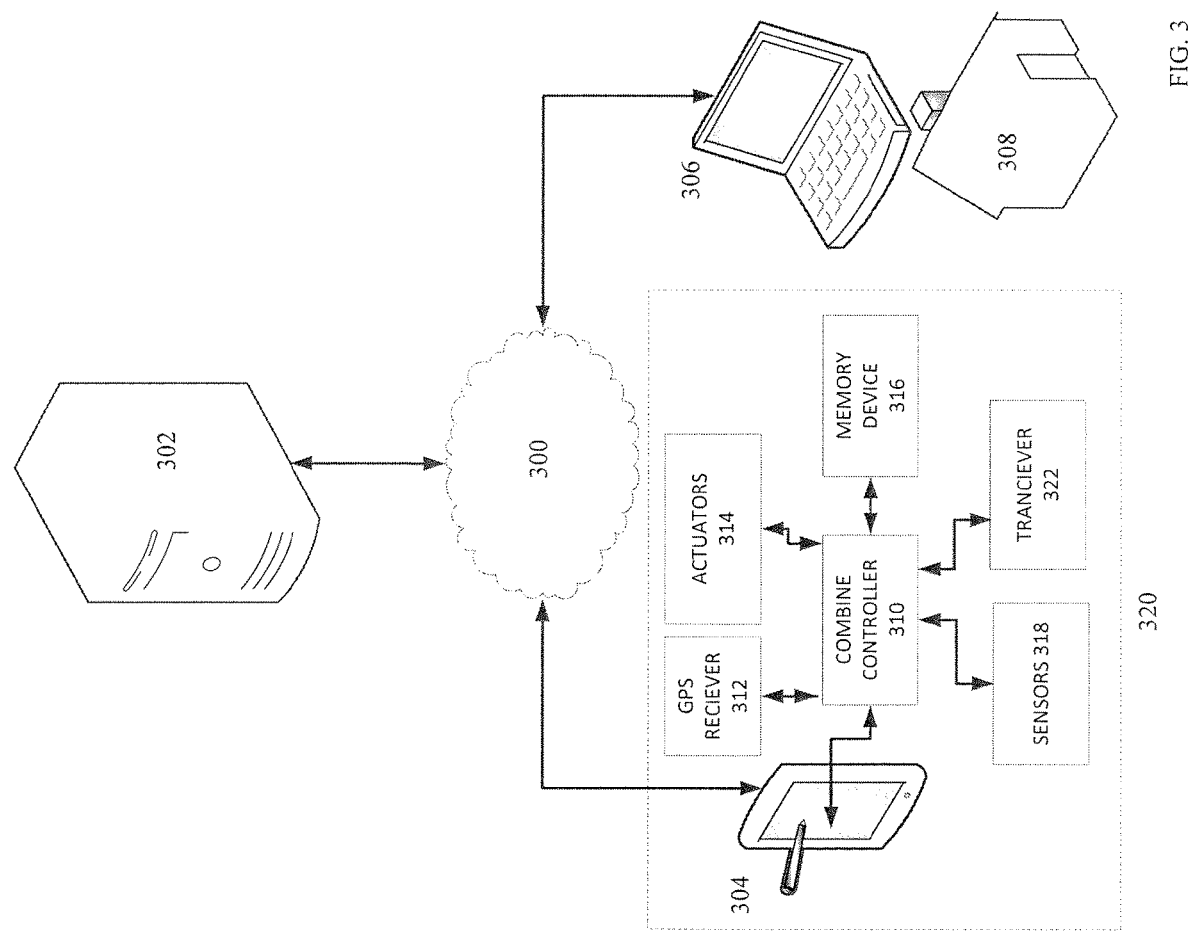
FIG. 3 is a system view of network based communication between the combine controller, a remote personal computer and a server, according to an embodiment of the invention.

Due to the potential buildup of particles in the engine compartment, estimating fire risk may be beneficial. Estimating fire risk is a process that can be performed by the combine using various risk factors. These risk factors may be entered via a user interface, or remote from the combine via a personal computer (PC). FIG. 3 shows an example of a system for controlling the combine and estimating fire risk. The system includes an interconnection between a control system 320 of combine 10, a remote PC 306 at location 308, and a remote server 302 through network 300 (e.g. Internet). It should be noted that combine 10 does not have to be connected to other devices through a network. The controller of combine 10 can be a standalone system that receives operating instructions and other information through a user interface, or through a removable memory device (e.g. Flash Drive). Harvesting may also be tracked and aided by GPS receiver 312.

Prior to operating combine 10, various risk factors may be received either through the user interface, or through transceiver 322 (e.g. WiFi, Bluetooth, Cellular) from a remote source. For example, the operator may use interface 304, or another entity (e.g. farm manager) may use PC 306 located at remote location 308 to enter information into the combine control system. Interface 304 and PC 306 generally allow the operator, or any other entity (e.g. farm manager), to view locally stored information from memory device 316 and/or download information from server 302 through network 300 via transceiver 322. The operator may select (via Interface 304 or PC 306) risk factors for estimating fire risk in the combine. Once these risk factors are selected, the operator can begin harvesting. Combine controller 310 then estimates and monitors the fire risk based on these selected risk factors. If a fire risk is estimated to be above a set threshold (e.g. probability), the combine may implement risk reduction action such as notifying the operator, requesting the operator to perform some action to reduce the estimated fire risk, and/or automatically controlling the combine in a manner to reduce the estimated fire risk.

Figure 4:
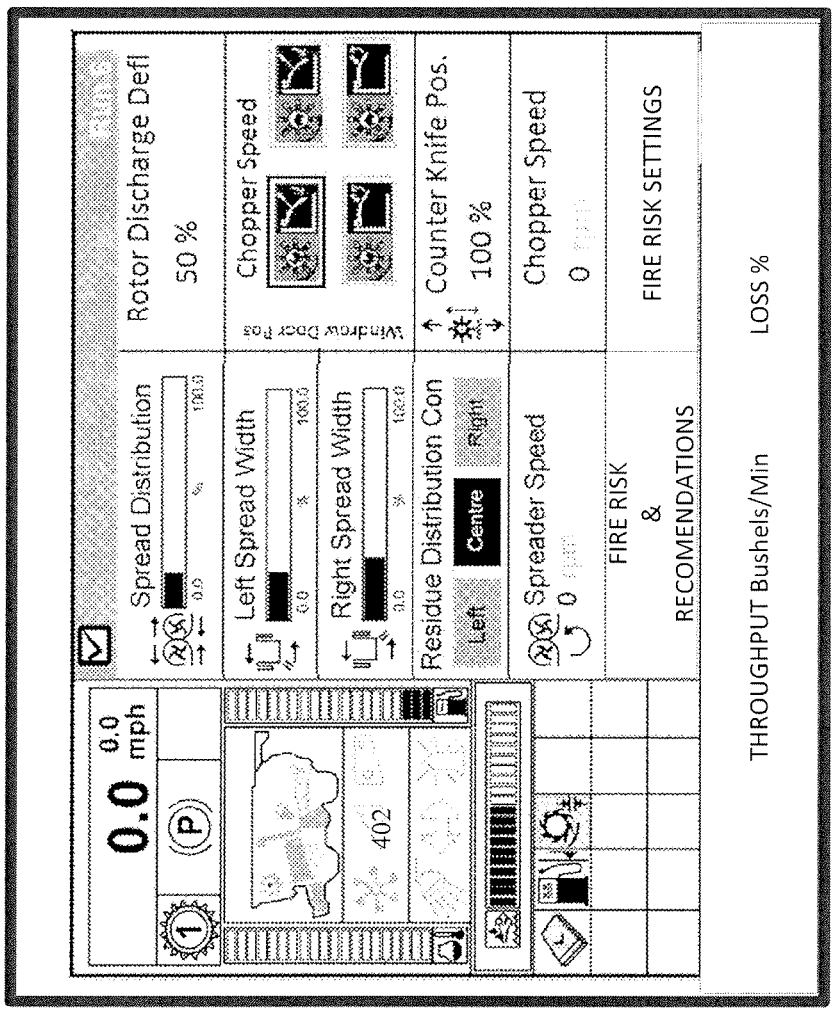
FIG. 4 is an illustration of a user interface for monitoring and controlling the combine, according to an embodiment of the invention.

The risk factors described above, may be selected and displayed on the interface 304. An example of interface 304 is shown in FIG. 4 wherein various parameters and data are displayed to the operator through a graphical user interface (GUI) 400. These may include a view of the map 402 with designated harvesting zones, land grade (not shown), current operational mode, throughput/loss, operational parameters/ states for the spreader wheels, chopper, counter knives, windrow door, etc., fire risk and fire risk settings for setting fire risk factors. These parameters as well as the fire risk factors may be set or modified by the operator prior to harvesting or during harvesting. For example, the operator can use a stylus or their finger on the touchscreen modify the fire risk settings.

Figure 5A:
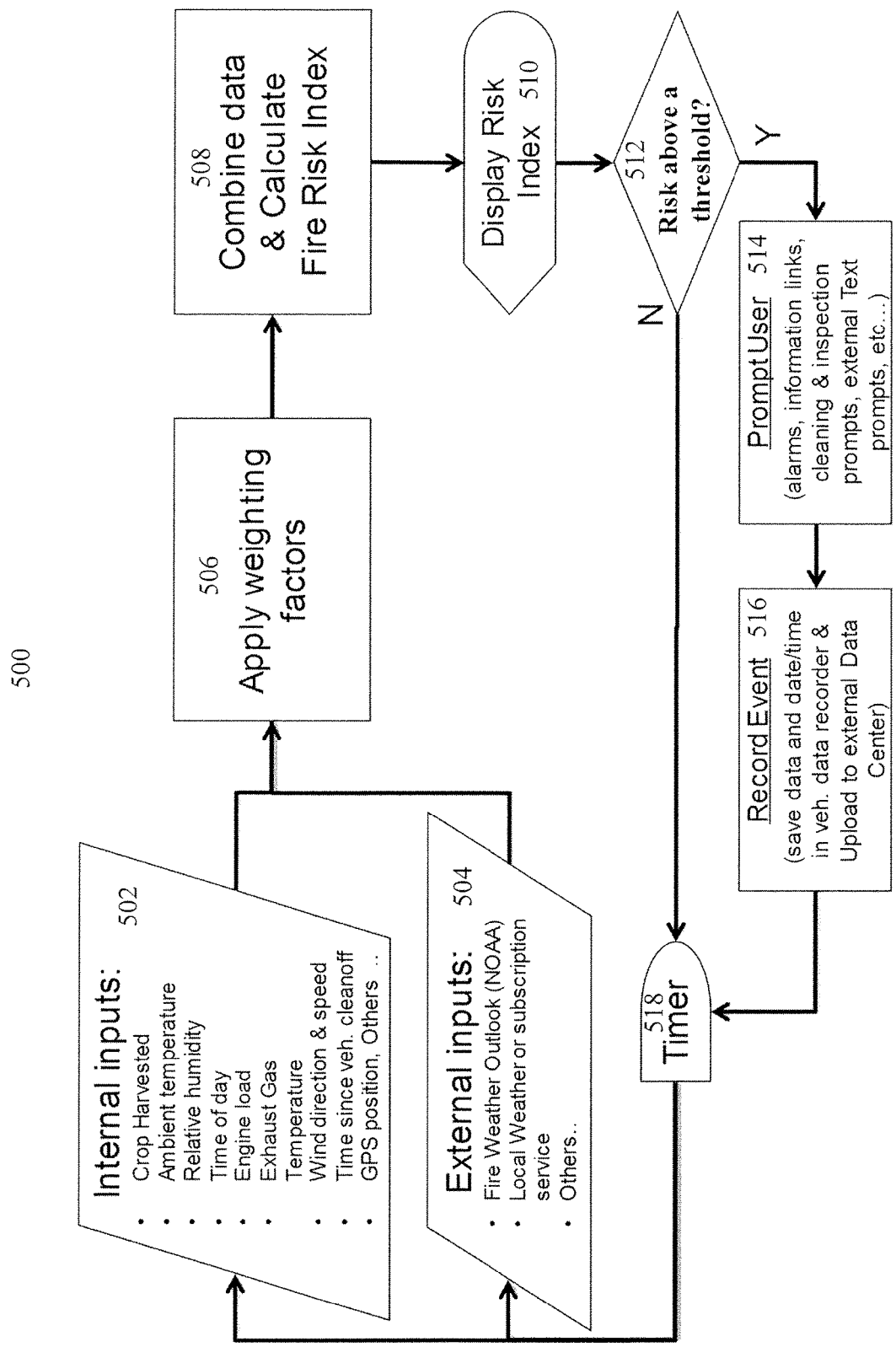
FIG. 5A is a flowchart of steps for estimating fire risk based on various risk factors, according to an embodiment of the invention.

FIG. 5A show a flowchart for setting fire risk factors and estimating/reporting the fire risk for the combine. In general, different types of inputs may be considered. These include internal inputs and external inputs. The internal inputs, which may be input (step 502) by the operator via interface 304 or by combine sensors 318, include but are not limited to the type of crop being harvested, ambient temperature, relative humidity, time of day, engine load, exhaust gas temperature, wind direction and speed, time since last vehicle cleaning, and GPS position. The external inputs, which are input (step 504) from remote sources via network 300, include but are not limited to local weather forecasts, and the local fire weather outlook from the National Oceanic and Atmospheric Association (NOAA). These external inputs may be received wirelessly by the combine via transceiver 322, or may be input by the operator via a memory device inserted into the combine interface.

Once the internal and external inputs are received, controller 310 (step 506) applies weighting factors. For example, some inputs (e.g. type of crop being harvested, ambient temperature, relative humidity) may be considered more important than other risk factors (e.g. wind direction/ speed) for estimating fire risk. The controller accounts for this by setting weighting factors based on their importance (e.g. more important risk factors for estimating fire risk are assigned higher weights).

In one example, each risk factor may be normalized between a value of 0-1 so that they can be compared to each other. These normalized values may then be multiplied by a weighting value between 0-1. For example, exhaust temperature may be normalized between 0-1 where 0 is equivalent to the minimum exhaust temperature, and 1 is equivalent to the maximum exhaust temperature. If the detected exhaust temperature during operation is in the middle of the range, then it may be given a value of 0.5. This value of 0.5 may then be multiplied by a weighting factor (e.g. 0.8) if exhaust temperature is considered an important factor in estimating fire risk. If exhaust temperature is not as important, then 0.5 may be multiplied by a smaller weighting factor of (e.g. 0.3).

Once all of the risk factors being considered are weighted based on their level of importance, controller 310 combines (see step 508) these weighted values to estimate the fire risk. For example, the weighted values may be summed together to estimate fire risk. In one example, assume that ten risk factors are used to estimate fire risk. These ten risk factors (after normalization), when summed, would result in a number in the range of 0-10 depending on their weighting. This summation could then be normalized between 0%-100%, where 0 is equivalent to 0% fire risk and 10 is equivalent to 100% fire risk.

An example of estimating fire risk by weighting certain risk factors is shown in the table of FIG. 5B. In table 530, five risk factors are considered. These risk factors include type of crop, ambient temperature, NOAA fire risk, ambient humidity, and exhaust temperature. Column 532 shows crop types $C_1$-$C_N$ having predetermined estimated risks $RISK_{C1}$-$RISK_{CN}$. Column 534 shows ambient temperatures $AT_1$-$AT_N$ having predetermined estimated risks $RISK_{AT1}$-$RISK_{ATN}$. Column 536 shows NOAA values $NA_1$-$NA_N$ having predetermined estimated risks $RISK_{NA1}$-$RISK_{NAN}$. Column 538 shows humidity values $H_1$-$H_N$ having predetermined estimated risks $RISK_{H1}$-$RISK_{HN}$. Column 540 shows exhaust temperatures $ET_1$-$ET_N$ having predetermined estimated risks $RISK_{ET1}$-$RISK_{ETN}$. Estimated risk values $RISK_{C1}$-$RISK_{CN}$, $RISK_{AT1}$-$RISK_{ATN}$, $RISK_{NA1}$-$RISK_{NAN}$, $RISK_{H1}$-$RISK_{HN}$ and $RISK_{ET1}$-$RISK_{ETN}$ may be set by the operator of the combine, by the farm owner/operator, by the manufacturer of the combine or some other third party. In addition, these risk values may be estimated based on experience, research and other factors.

During operation, controller 310 accesses table 530 and extracts the risk associated with the type of crop, ambient temperature, NOAA fire risk, ambient humidity, and exhaust temperature currently measured. These values are then weighted and summed to produce the estimated fire risk.

Once the fire risk is estimated, it may be utilized in different manners. For example, during operation, the estimated fire risk may be displayed (step 510) to the operator through interface 304. Controller 310 may also estimate (step 512) if the fire risk is higher than a predetermined threshold (i.e. higher than usual). This estimation may be based on previous experience, or any number of risk factors. If the fire risk is estimated not to be higher than the predetermined threshold (i.e. not higher than usual), then harvesting continues and the process described above is eventually repeated periodically based on timer 518. However, if the fire risk is estimated to be higher than the predetermined threshold (i.e. higher than usual), then controller 310 notifies the user (step 514). This notification may be issued in a number of different manners including, but not limited to an audible and/or visual alarm, prompts on interface 304, transmitted emails, transmitted text messages, etc. In a first example, interface 304 may emit a buzzer sound and flash the screen to let the operator know of the estimated fire risk. In a second example, a text message may be automatically transmitted to the operator and/or a remote user. It is noted that the predetermined threshold may be a value set by the operator of the combine, by the farm owner/operator, by the manufacturer of the combine or some other third party. This predetermined threshold may be estimated based on experience, research and other factors.

In addition to notifying the operator and/or the farm manager of the estimated risk, controller 310 may also display prompts. These prompts may request certain actions to be taken by the operator, including but not limited to slowing down to reduce engine load, and stopping to clean the engine compartment and other combine compartments.

In other example, controller 310 may automatically control the combine to reduce the estimated fire risk. Controller 310 may automatically reduce harvesting speed to reduce engine load and therefore operating temperature. If the estimated fire risk increases above a certain level, controller 310 may also stop the combine harvesting operation and force the operator to clean the engine compartment before resuming.

In addition to notifying the operator of the estimated fire risk, and prompting the operator to perform tasks, controller 310 may also create a log of operations. Controller 310 may store (step 516) the estimated fire risk over time, risk factors being considered when estimating the fire risk, prompts and alarms issued to the operator, and how the operator responded to the alarms and prompts. This log may then be uploaded to a removable memory device, or to another compute/server via network 300. This allows the operation of the combine to be monitored and reviewed by other entities such as the manufacturer, farm manager, etc.

It should be noted that the fire risk is an estimation (not proof positive) of the chance that a fire could ignite given certain known conditions. The accuracy of this estimation is dependent on a number of variables including the risk factors described above and the manner in which they are weighted and combined. However, other variables (unknown to the system) may also contribute to the fire risk. These may include operator error (e.g. deficient inspection/cleaning procedures, inadequate maintenance, etc.), unforeseen conditions (e.g. birds nest in the engine compartment, etc.) as well as other variables that affect the risk of fire.

Steps 502-518 shown in FIG. 5A may be performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIG. 5A, are implemented in software code or instructions which are tangibly stored on a tangible computer readable medium. Upon loading and executing such software code or instructions by the controller 310, the controller 310 may perform any of the functionality of the controller 310 described herein, including the steps shown in FIG. 5A described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
an engine for propelling the combine;
a feeder housing for receiving cut crop;
a separating system for threshing the cut crop to produce grain and residue;
a residue chopper for chopping the residue; and
a controller configured to:
estimate risk factors that correlate to a risk of fire in the engine due to airborne particles created by at least one of the cut crop, the separating system or the residue chopper,
estimate a fire risk based on the risk factors, and
implement corrective action based on the estimated fire risk.

2. The combine of claim 1,
wherein the controller is further configured to:
estimate the risk factors as at least one of type of crop, ambient temperature, relative humidity, time of day, engine load, exhaust gas temperature, wind direction and speed, time since vehicle cleanoff, or GPS position.

3. The combine of claim 1,
wherein the controller is further configured to:
estimate the risk factors based on external inputs received by the receiver, the external inputs including at least one of National Oceanic and Atmospheric Association fire weather outlook, or local weather service.

4. The combine of claim 1,
wherein the controller is further configured to:
estimate other risk factors that correlate to a risk of fire in the engine, and
estimate the fire risk by applying a weighting factors to the estimated risk factors and combining the weighted risk factors.

5. The combine of claim 1,
wherein the controller is further configured to:
estimate if the fire risk is greater than a threshold,
if the fire risk is not greater than the threshold, implement the corrective action in a first manner, and
if the fire risk is greater than the threshold, implement the corrective action in a second manner different than the first manner.

6. The combine of claim 1,
wherein the controller is further configured to:
estimate the fire risk in a periodic manner according to a cycle of a timer, and
setting the cycle of the timer based on the determined risk factors.

7. The combine of claim 1,
wherein the controller implements the corrective action by:
prompting the operator of the combine to perform an action to maintain or decrease the estimated fire risk, the action including at least one of modifying operation of the combine, inspecting the combine or cleaning the combine.

8. The combine of claim 1,
wherein the controller is further configured to:
   record the risk factors and the estimated fire risk in memory,
   upload the risk factors and the estimated fire risk to a server.

9. The combine of claim 1,
wherein the controller is configured to implement the corrective action by:
   reducing a workload of the engine if the estimated fire risk is above a predetermined level.

10. The combine of claim 1,
wherein the controller is configured to implement the corrective action by:
   outputting an audible or visual alarm or an indicator for notifying the operator of the estimated fire risk.

11. A method for controlling a combine including an engine for propelling the combine, a feeder housing for receiving cut crop, a separating system for threshing the cut crop to produce grain and residue, a residue chopper for chopping the residue, and a controller, the method comprising:
   determining, by the controller, risk factors that correlates to a risk of fire in the engine due to airborne particles created by at least one of the cutting wheel, the separating system or the residue chopper;
   estimating, by the controller, a fire risk based on the risk factors; and
   implementing, by the controller, corrective action based on the estimated fire risk.

12. The method of claim 11, further comprising:
estimating, by the controller, the risk factors as at least one of type of crop, ambient temperature, relative humidity, time of day, engine load, exhaust gas temperature, wind direction and speed, time since vehicle cleanoff, or GPS position.

13. The method of claim 11, further comprising:
estimating, by the controller, the risk factors based on external inputs received by the receiver, the external inputs including at least one of National Oceanic and Atmospheric Association fire weather outlook, or local weather service.

14. The method of claim 11, further comprising:
estimating, by the controller, other risk factors that correlate to a risk of fire in the engine; and
estimating, by the controller, the fire risk by applying a weighting factors to the risk factors and combining the weighted risk factors.

15. The method of claim 11, further comprising:
estimating, by the controller, if the fire risk is greater than a threshold;
if the estimated fire risk is not greater than the threshold, implementing the corrective action in a first manner; and
if the estimated fire risk is greater than the threshold, implementing the corrective action in a second manner different than the first manner.

16. The method of claim 11, further comprising:
estimating, by the controller, the fire risk in a periodic manner according to a cycle of a timer; and
setting, by the controller, the cycle of the timer based on the estimated risk factors.

17. The method of claim 11, wherein the corrective action is implemented by:
prompting the operator of the combine to perform an action to maintain or decrease the estimated fire risk, the action including at least one of modifying operation of the combine, inspecting the combine or cleaning the combine.

18. The method of claim 11, further comprising:
recording, by the controller, the risk factors and the estimated fire risk in memory; and
uploading, by the controller, the risk factors and the estimated fire risk to a server.

19. The method of claim 11, wherein the corrective action is implemented by:
reducing a workload of the engine if the estimated fire risk is above a predetermined level.

20. The method of claim 11, wherein the corrective action is implemented by:
outputting an audible or visual alarm or an indicator for notifying the operator of the estimated fire risk.

* * * * *